United States Patent [19]
Miyoshi

[11] Patent Number: 6,061,019
[45] Date of Patent: May 9, 2000

[54] SATELLITE CAPTURING/TRACKING METHOD AND APPARATUS CAPABLE OF REDUCING WORKLOADS OF EARTH STATION

[75] Inventor: Hiroaki Miyoshi, Tokyo, Japan

[73] Assignee: NEC Corporation, Tokyo, Japan

[21] Appl. No.: 09/108,821

[22] Filed: Jul. 1, 1998

[30] Foreign Application Priority Data

Jul. 1, 1997 [JP] Japan ..................................... 9-175691

[51] Int. Cl.⁷ .................................................. H04B 7/185
[52] U.S. Cl. .......................................... 342/359; 455/12.1
[58] Field of Search ..................................... 342/359, 352, 342/430, 354, 356, 353, 357.09; 455/427, 430, 12.1

[56] References Cited

U.S. PATENT DOCUMENTS

| | | | |
|---|---|---|---|
| 5,184,139 | 2/1993 | Hirako et al. ............................. | 342/359 |
| 5,313,215 | 5/1994 | Walker .................................... | 342/352 |
| 5,583,514 | 12/1996 | Fulop ...................................... | 342/359 |
| 5,678,171 | 10/1997 | Toyama et al. .......................... | 342/359 |
| 5,880,693 | 3/1999 | Drummer ................................ | 342/354 |

FOREIGN PATENT DOCUMENTS

| | | |
|---|---|---|
| 4-342700 | 11/1992 | Japan . |
| 7-10096 | 1/1995 | Japan . |

*Primary Examiner*—Gregory C. Issing
*Attorney, Agent, or Firm*—Scully, Scott, Murphy & Presser

[57] ABSTRACT

A satellite capturing/tracking apparatus including: an antenna drive unit for driving an antenna in such a manner that said antenna is directed to a direction along which electromagnetic waves are transmitted from either a data relay satellite or a space station in response to a capturing/tracking command; an orbit/position detecting unit for receiving clock signals transmitted from a plurality of GPS satellites to calculate and output the present orbit and position of said apparatus as orbit/position information; a first storage unit for previously storing therein a capturing/tracking sequence program with relative time instants, produced by an azimuth angle and an elevation angle of either said data relay satellite or said space station; a second storage unit for storing therein data used to define a relationship between said azimuth angle, said elevation angle, and the orbit/position of said apparatus with respect to either said data relay satellite or said space station; and a capturing/tracking control unit for producing a capturing/tracking command for capturing/tracking either said data relay satellite or said space station based on said orbit/position information of said orbit/position detecting unit, said capturing/tracking sequence program of said first storage unit, and said relationship data of said second storage unit; whereby, while data is communicated via said data relay satellite between the space station and an earth station, said space station and the data relay satellite are mutually captured/tracked with each other.

7 Claims, 2 Drawing Sheets

SATELLITE CAPTURING/TRACKING METHOD AND APPARATUS CAPABLE OF REDUCING WORKLOADS OF EARTH STATION

BACKGROUND OF THE INVENTION

1. Field of the Invention

The present invention generally relates to a satellite capturing/tracking method, and a satellite capturing/tracking apparatus. More specifically, the present invention is directed to satellite capturing/tracking method and apparatus used to mutually capture/track a space station and a data relay satellite while a data communication is carried out via the data relay satellite between the space station and an earth station.

2. Description of the Related Art

Conventionally, as a method for capturing and/or tracking a data relay station by a space station, such a tacking method has been utilized by combining an RF automatic tracking method with a program tracking method. First, in this RF automatic tracking method, the antenna is driven in such a way that the main axis of the antenna employed in the space station is directed to the transmission (propagation) direction of the electromagnetic waves. After the electromagnetic waves have been captured with the capture range of the antenna, this RF automatic tracking method can be actuated. To capture the electromagnetic waves within the capture range of this antenna, the program tracking method is employed in order that the antenna is directed to the transmission direction of the electromagnetic waves. In this program tracking method, a data relay satellite is tracked by a space station as follows. An earth station determines an orbit of the space station and an orbit of the data relay satellite, and then calculates a capturing/tracking parameter based upon the determined orbits. The resultant capturing/tracking parameter is registered, or programmed in both the data relay satellite and the space station.

In the above-described conventional satellite capturing/tracking method, since this capturing/tracking method depends upon the orbit decisions made by the earth station, the space station must capture/track the data relay satellite even in such a case that both the data relay station and the space station are located within the invisible range with respect to the earth station. As an operation method for such a capturing/tracking method, Japanese Unexamined Patent Application No. 7-10096 discloses the below-mentioned operation technique. First, when the data relay satellite is located within the visible range, the earth station transmits both the microcommand and the data table to the data relay satellite. The microcommand is produced by symbolizing a series of operation sequences as a single command having a command issuing time instant. The data table is employed so as to expand this microcommand into a series of base command groups used to actually operate the satellite. As a result, the data relay satellite expands the received microcommand to the base command group with reference to the received data table. The command issuing time instant which is described at the satellite time is added to this base command group. Thereafter, when the space station is entered into the visible range, the earth station transmits the base command related to the space station among this expanded base command group to the space station.

On the other hand, the data relay satellite and the space station receive electromagnetic waves sent from 4 sets of GPS (Global Positioning System) satellites so as to make both the satellite time instants coincident with the GPS time corresponding to the absolute time instants defined in the GPS system.

As a result, the data relay satellite and the space station compare the respective satellite time instants with the command issuing time instants added to the respective base commands. When these time instants are made coincident with each other, the data relay satellite and the space station issue this command to the respective electronic appliances employed in the own satellite and the own space station, so that the data relay satellite and space station can be automatically operated without being instructed by the commands transmitted from the earth station.

On the other hand, in the above-described conventional satellite capturing/tracking method, since the orbits of the space station and the data relay satellite are determined, depending upon the earth station, there is such a drawback that this may give adverse influences to the operation loads of the earth station.

Also, in the conventional capturing/tracking method described in Japanese Unexamined Patent Application No. 7-10096, since it is a fact that the same time instant never appears twice, the capturing/tracking parameter must be periodically calculated and registered, or programmed by the earth station. Therefore, this causes another problem that the operation loads given to the earth station are similarly adversely influenced.

SUMMARY OF THE INVENTION

The present invention has been made to solve the above-described problems, and therefore, has an object to provide a satellite capturing/tracking apparatus by which a space station can autonomously capture and/or track a data relay satellite, and operation loads given to an earth station can be reduced.

Also, another object of the present invention is to provide a satellite capturing/tracking method capable of realizing the autonomous capturing/tracking operation by the space station, while reducing workloads of the earth station.

To achieve the above-described objects, a satellite capturing/tracking apparatus, according to a first aspect of the present invention, is featured by comprising: an antenna drive unit for driving an antenna in such a manner that the antenna is directed to a direction along which electromagnetic waves are transmitted from at least one of a data relay satellite and a space station in response to a capturing/tracking command; an orbit/position detecting unit for receiving clock signals transmitted from a plurality of GPS satellites to calculate a present orbit of an own unit and a present position thereof and for outputting the calculated present orbit and position as orbit/position information; a first storage unit for previously storing thereinto a capturing/tracking sequence program with relative time instants, produced by an azimuth angle and an elevation angle of one of the data relay satellite and the space station; a second storage unit for storing thereinto data used to define a relationship between the azimuth angle and the elevation angle and the orbit/position of the own unit with respect to each of the plural data relay satellites and the space station, which can be captured/tracked; and a capturing/tracking control unit for producing a capturing/tracking command to one of such a data relay satellite and a space station, which should be captured/tracked, based on the orbit/position information of the orbit/position detecting unit, the capturing/tracking sequence program of the first storage unit, and the relationship data of the second storage unit, whereby: while data is communicated via the data relay satellite between the space station and an earth station, the space station and the data relay station are mutually captured/tracked with each other.

Also, a satellite capturing/tracking apparatus, according to a second aspect of the present invention, is featured by that in the above-described satellite capturing/tracking apparatus of the first aspect, the orbit/position information corresponds to an orbit element of the own unit and longitude/latitude of an orbit plane projected on the earth surface; and the relationship data stored in the second storage unit corresponds to visible/invisible information about each of the data relay satellite and the space station with respect to the longitude/latitude of the own unit.

Also, a satellite capturing/tracking apparatus, according to a third aspect of the present invention, is featured by that in the above-described satellite capturing/tracking apparatus of the first aspect, the first storage unit and the second storage unit are constituted by data rewritable memories.

Also, a satellite capturing/tracking apparatus, according to a fourth aspect of the present invention, is featured by that in the above-described satellite capturing/tracking apparatus of the first aspect, the capturing/tracking command supplied to the antenna drive unit contains drive angle/drive velocity, and the antenna drive unit produces an angle signal of the antenna.

Further, to achieve the above-explained objects, a satellite capturing/tracking method, according to a fifth aspect of the present invention, is featured by comprising the steps of: driving an antenna in such a manner that the antenna is directed to a direction along which electromagnetic waves are transmitted from at least one of a data relay satellite and a space station in response to a capturing/tracking command; receiving clock signals transmitted from a plurality of GPS satellites to calculate a present orbit of an own unit and a present position thereof to thereby output the calculated present orbit and position as orbit/position information; previously storing thereinto a capturing/tracking sequence program with relative time instants, produced by an azimuth angle and an elevation angle of one of the data relay satellite and the space station; storing thereinto data used to define a relationship between the azimuth angle and the elevation angle and the orbit/position of the own unit with respect to each of the plural data relay satellites and the space station, which can be captured/tracked; and producing a capturing/tracking command to one of such a data relay satellite and a space station which should be captured/tracked, based on the orbit/position information, the capturing/tracking sequence program, and the relationship data, whereby: while data is communicated via the data relay satellite between the space station and an earth station, the space station and the data relay station are mutually captured/tracked with each other.

Also, a satellite capturing/tracking method, according to a sixth aspect of the present invention, is featured by that in the satellite capturing/tracking method of the fifth aspect, the orbit/position information corresponds to an orbit element of the own unit and longitude/latitude of an orbit plane projected on the earth surface; and the relationship data corresponds to visible/invisible information about each of the data relay satellite and the space station with respect to the longitude/latitude of the own unit.

Also, a satellite capturing/tracking method, according to a seventh aspect of the present invention, is, featured by that in the satellite capturing/tracking method of the fifth aspect, the capturing/tracking command supplied in the antenna driving step contains drive angle/drive velocity, and at the antenna driving step, an angle signal of the antenna is produced.

BRIEF DESCRIPTION OF THE DRAWINGS

The above and further objects, novel features and advantages of the present invention will more fully become obvious upon an understanding of the following detailed description taken in connection with the accompanying drawings, in which.

DETAILED DESCRIPTION OF THE PREFERRED EMBODIMENTS

Referring now to drawings, a description will be made of various preferred embodiments of the present invention in detail.

Arrangement of Satellite Capturing/Tracking System

Figure 1:
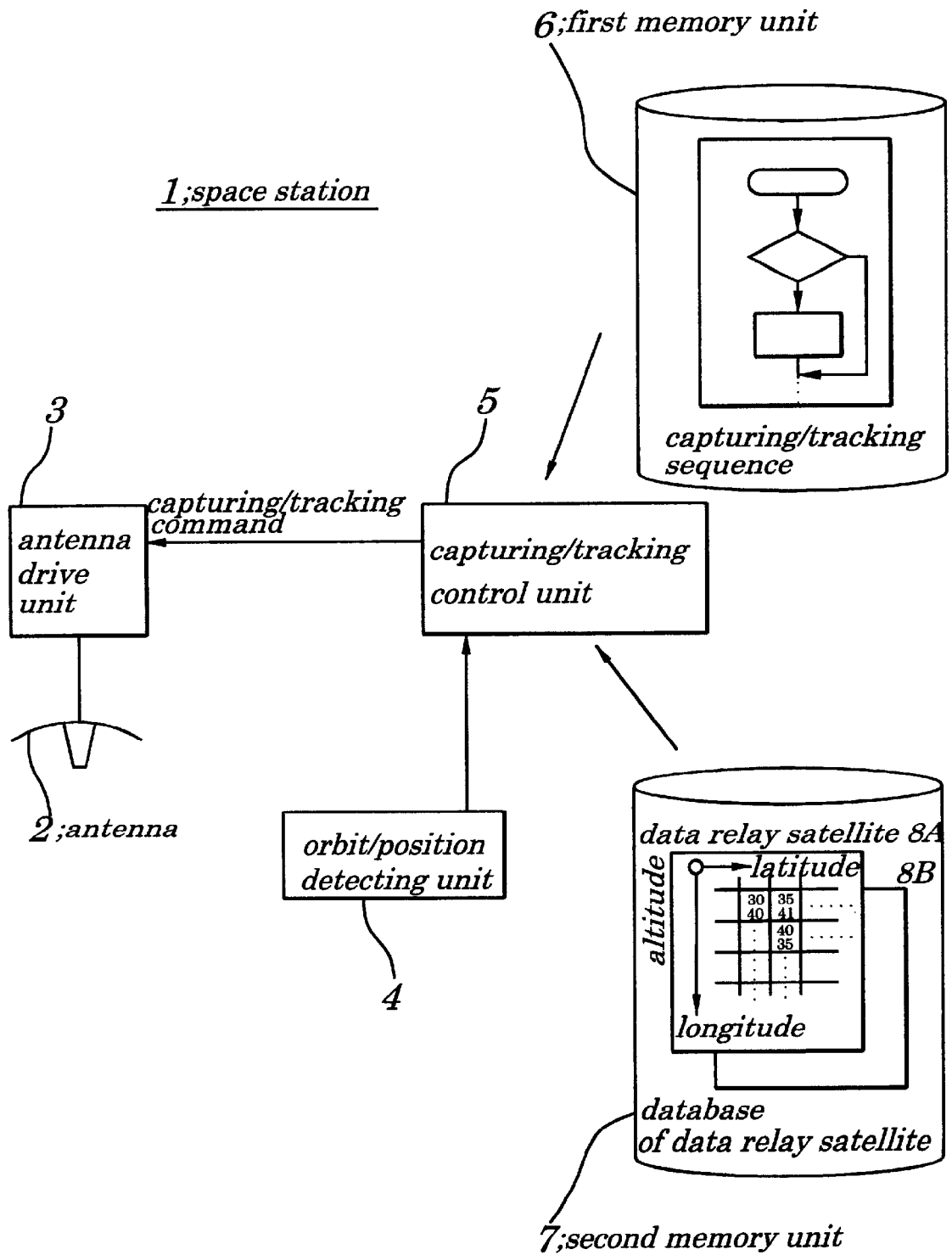
FIG. 1 illustratively represents an electronic arrangement of a space station to which a satellite capturing/tracking apparatus, according to a preferred embodiment of the present invention, is applied.
Figure 2:
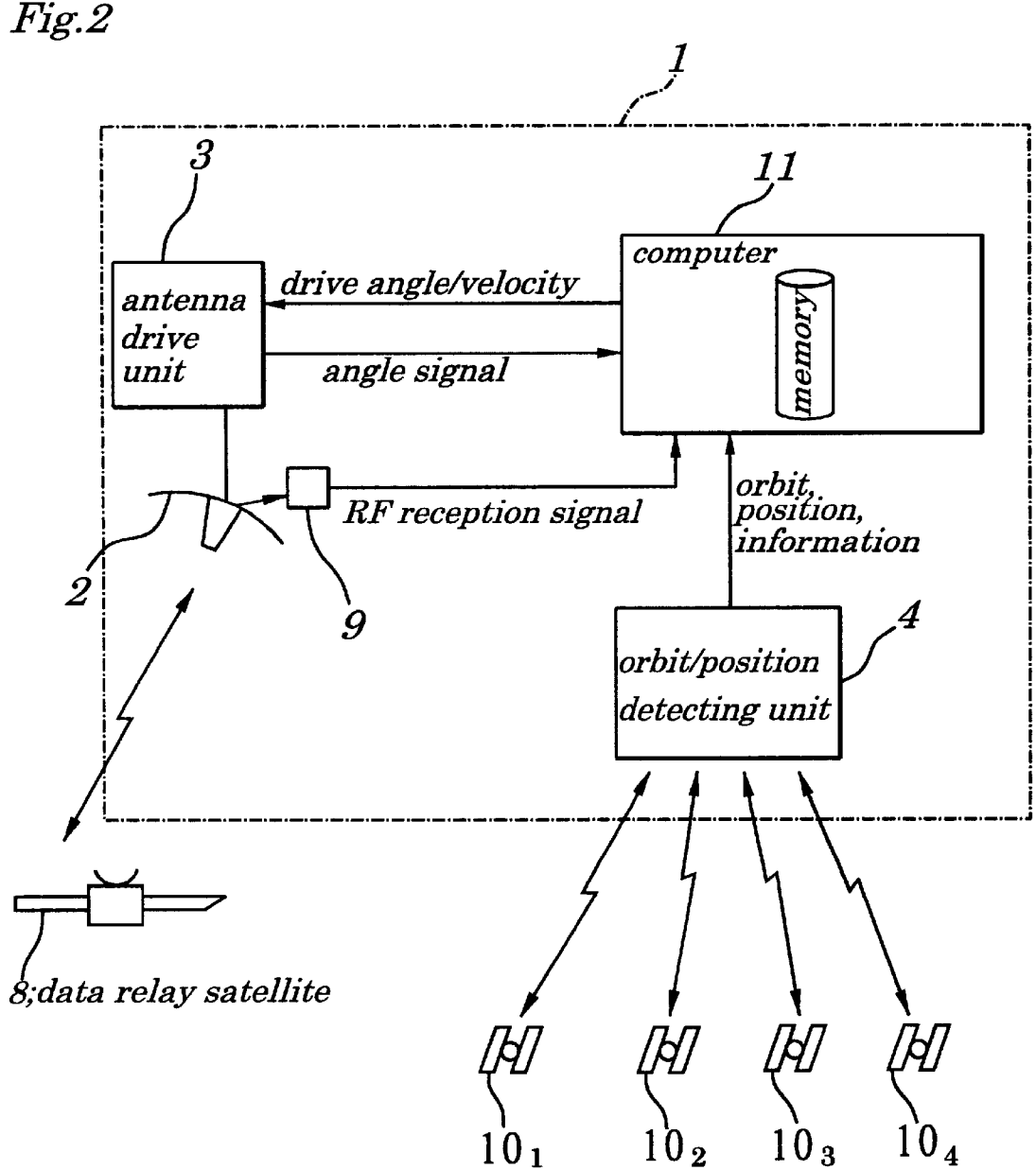
FIG. 2 is a schematic block diagram for showing an electronic arrangement of a satellite capturing/tracking system with employment of the space station shown in FIG. 1.

FIG. 1 is a schematic block diagram for indicating an electronic arrangement of a space station 1 to which a satellite capturing/tracking apparatus, according to a preferred embodiment of the present invention, is applied. FIG. 2 is a schematic block diagram for showing an electronic arrangement of a satellite capturing/tracking system with employment of the space station 1 shown in FIG. 1.

As illustrated in FIG. 1, the space station 1 is arranged by an antenna 2, an antenna drive unit 3, a capturing/tracking control unit 5, an orbit/position detecting unit 4, a first memory unit 6, and a second memory unit 7.

The antenna drive unit 3 is constructed of a stepper motor equipped with an angle detecting encoder, and the like. In response to a capturing/tracking command made of a drive angle, a drive velocity, and the like, which is supplied from the capturing/tracking control unit 5, the antenna drive unit 3 drives the antenna 2 in order that this antenna 2 may be directed to a direction along which electromagnetic waves are transmitted, or propagated from a data relay satellite 8 shown in FIG. 2. Also, the antenna drive unit 3 supplies an angle signal corresponding to an angle of the antenna 2, which is detected by the angle detecting encoder, to the capturing/tracking control unit 5.

Also, as indicated in FIG. 2, a tracking receiver 9 for performing the RF automatic tracking method is provided in the vicinity of the antenna 2. The tracking receiver 9 furnishes an RF reception signal received by the antenna 2 to the capturing/tracking control unit 5.

The orbit/position detecting unit 4 is arranged by a GPS(Global Positioning System) receiver and the like. This orbit/position detecting unit 4 receives clock signals transmitted from four GPS satellites $10_1$ to $10_4$ indicated in FIG. 2 so as to calculate a present(current) orbit and a present position of own station. Then, the orbit/position detecting unit 4 supplies the calculated present orbit/position as orbit/position information to the capturing/tracking control unit 5. It should be noted that orbit/position of an own station implied a geometric position of the space station 1, namely longitude/latitude of an orbit element and an orbit plane with respect to a ground surface projection.

The capturing/tracking control unit 5, the first storage unit 6, and the second storage unit 7 constitute a computer 11 indicated in FIG. 2.

The first storage unit 6 and the second storage unit 7 are arranged by data rewritable memories, e.g., an SRAM and an EEPROM. A capturing/tracking sequence made based upon an azimuth angle of the data relay satellite 8 has been previously stored into the first storage unit 6 in a program form at relative time instants. Data (database of data relay satellite) has been previously stored in the second storage unit 7. This data defines a relationship between satellite position angles (azimuth angles, elevation angles) of a plurality of data relay satellites 8 which can be captured and tracked, and both the orbit/position of the own station. In other words, as shown in FIG. 1, visible/invisible information with respect to each of the longitude/latitude of the own station is stored in the second storage unit 7 with respect to each of these data relay satellites 8A, 8B, . . . .

The capturing/tracking control unit 5 produces a capturing/tracking command of such a data relay satellite to be captured/tracked on the basis of the orbit/position information supplied from the orbit/position detecting unit 4, the capturing/tracking sequence program stored in the first storage unit 6, and further the data relay satellite database stored in the second storage unit 7. Then, the capturing/tracking control unit 5 supplies this produced capturing/tracking command to the antenna drive unit 3.

Capturing/Tracking Operations for Data Relay Satellite

Next, a description will now be made of capturing/tracking operations for a certain data relay satellite by the space station 1 having the above-described arrangement. First, the orbit/position detecting unit 4 receives the clock signals transmitted from 4 sets of GPS satellites $10_1$ to $10_4$ so as to calculate a present orbit of the own station and a present position thereof in high precision. Then, the orbit/position detecting unit 4 supplies the calculated present orbit/position as orbit/position information to the capturing/tracking control unit 5. As a result, the capturing/tracking control unit 5 retrieves the data relay satellite database stored in the second storage unit 7 based upon the supplied orbit/position information to thereby acquire the satellite angle (azimuth angle and elevation angle) of the relevant data relay satellite.

Next, the capturing/tracking control unit 5 executes the capturing/tracking sequence program stored in the first storage unit 6 while using the acquired azimuth angle as a parameter in order to produce a capturing/tracking command (namely, set values of drive angle/velocity of antenna drive unit 3) of such a data relay satellite which should be captured/tracked. Then, the capturing/tracking control unit 5 supplies the produced capturing/tracking command to the antenna drive unit 3. Concretely speaking, the capturing/tracking control unit 5 executes the capturing/tracking operations capable of avoiding the singular points of the antenna drive angle. These singular points are caused by the PFD (Power Flux Density) restrictions and also the geometric invisible phenomenon due to shadows of the earth.

Since the above-described capturing/tracking operation is executed, the antenna drive unit 3 may drive the antenna 2 in response to the capturing/tracking command supplied from the capturing/tracking control unit 5 in such a manner that the antenna 2 is directed to the direction along which the electromagnetic waves are transmitted from the data relay satellite 8.

It should also be noted that the presently-actuated capturing/tracking operation may be continued in the tracking mode by this program tracking method. Alternatively, the following tracking mode may be carried out. That is, after the RF reception signal is once entered into the capture range thereof, the computer 11 switches the presently-actuated tracking mode by this program tracking method into another tracking mode by the above-described RF automatic tracking method with employment of an RF reception signal supplied from a tracking receiver 9. As a consequence, the computer may correct the error caused by the tracking mode by the program tracking method so as to achieve higher tracking precision.

As previously described, in accordance with the above-described arrangement of this embodiment, since the on-board type orbit/position detecting unit 4 for detecting the orbit/position of the own station is installed in the space station 1, the orbit/position of the own space station can be determined without assistance by the earth station. Also, the azimuth angle and the elevation angle of the data relay satellite 8 are calculated based upon the orbit/position of the space station 1 with reference to the data relay satellite database, and the capturing/tracking sequence program produced by using the azimuth angle and the elevation angle as the parameter is automatically executed. As a result, the data relay satellite can be captured/tracked without assistance by the earth station.

Furthermore, according to the embodiment, since both the first storage unit 6 and the second storage unit 7 are arranged by employing the rewritable memories, when the operation sequence is changed, the entire satellite capturing/tracking system can be flexibly operated. Also, since a plurality of data relay databases, the total number of which is equal to that of the data relay satellites 8 that can be captured/tracked, have been previously stored into the second storage unit, it is possible to realize the satellite communications among the plural satellites by utilizing a plurality of data relay satellites.

While the typical preferred embodiments of the present invention have been described with reference to the drawings, the present invention is not apparently limited thereto, but may be modified, changed, and substituted without departing from the technical scope and spirit of the present invention.

For instance, although the satellite capturing/tracking apparatus according to the present invention has been applied to the space station in the above-described embodiment, this satellite capturing/tracking apparatus may be applied to the data relay satellite.

As previously described in detail, in accordance with the arrangement of the satellite capturing/tracking apparatus according to the present invention, since the data relay satellite can be autonomously captured/tracked by the space station, the operation loads given to the earth station can be reduced.

It is thus apparent that the present invention should by no means be limited to the illustrated embodiment and various modification and change may be suggested without departing from the scope and spirit of the invention.

Finally, the present application claims the priority of Japanese Patent Application No. Hei9-175691 filed on Jul. 1, 1997, Which is herein incorporated by reference.

What is claimed is:

1. A satellite capturing/tracking apparatus for use with an earth station disposed on the surface of the earth, a space station in orbit around the earth for communicating data with said earth station, and a data relay satellite in orbit around the earth station for relaying said data between said space station and said earth station, wherein one of said data relay satellite or said space station contains the apparatus, the apparatus comprising:

an antenna drive unit for driving an antenna in such a manner that said antenna is directed to a direction along which electromagnetic waves are transmitted from the other of said data relay satellite or said space station in response to a capturing/tracking command;

an orbit/position detecting unit for receiving clock signals transmitted from a plurality of GPS satellites to calculate and output a present orbit and position of said one of said data relay satellite or said space station containing the apparatus as orbit/position information;

a first storage unit for previously storing therein a capturing/tracking sequence program with relative time instants, consisting of an azimuth angle and an elevation angle of the other of said data relay satellite or said space station;

a second storage unit for storing therein data used to define a relationship between said azimuth angle, said elevation angle, and the orbit/position of said one of said data relay satellite or said space station containing the apparatus with respect to the other of said data relay satellite or said space station; and a capturing/tracking control unit for producing a capturing/tracking command for capturing/tracking the other of said data relay satellite or said space station based on said orbit/position information of said orbit/position detecting unit, said capturing/tracking sequence program of said first storage unit, and said relationship data of said second storage unit;

whereby, while said data is communicated via said data relay satellite between said space station and said earth station, said space station and said data relay satellite are captured/tracked with each other without the assistance of said earth station.

2. A satellite capturing/tracking apparatus according to claim 1, wherein said orbit/position information corresponds to an orbit element of said one of said data relay satellite or said space station containing the apparatus and longitude/latitude of an orbit plane projected on the earth surface; and said relationship data stored in said second storage unit corresponds to visible/invisible information about the other of said data relay satellite or said space station with respect to the longitude/latitude of said one of the data relay satellite or said space station containing the apparatus.

3. A satellite capturing/tracking apparatus according to claim 1, wherein said first storage unit and said second storage unit are constituted by data rewritable memories.

4. A satellite capturing/tracking according to claim 1, wherein said capturing/tracking command supplied to said antenna drive unit contains drive angle/drive velocity, and said antenna drive unit produces an angle signal of said antenna.

5. A satellite capturing/tracking method in which an earth station is disposed on the surface of the earth, a space station is in orbit around the earth for communicating data with said earth station, and a data relay satellite is in orbit around the earth station for relaying said data between said space station and said earth station, wherein the method comprising the steps of:

driving an antenna at one of said data relay satellite or space station in such a manner that said antenna is directed to a direction along which electromagnetic waves are transmitted from the other of said data relay satellite or said space station in response to a capturing/tracking command;

receiving clock signals at said one of said data relay satellite or space station transmitted from a plurality of GPS satellites to calculate and output a present orbit and position of said one of said data relay satellite or space station as orbit/position information;

previously storing at said one of said data relay satellite or space station in a first storage unit thereof, a capturing/tracking sequence program with relative time instants, consisting of an azimuth angle and an elevation angle of the other of said data relay satellite and said space station;

storing at said one of said data relay satellite or space station in a second storage unit thereof, data used to define a relationship between said azimuth angle, said elevation angle, and said orbit/position of said one of said data relay satellite or space station with respect to the other of said data relay satellite or said space station; and producing at said one of said data relay satellite or space station a capturing/tracking command to capture/track the other of said data relay satellite or said space station based on said orbit/position information, said capturing/tracking sequence program, and said relationship data;

whereby, while said data is communicated via said data relay satellite between said space station and said earth station, said space station and said data relay satellite are captured/tracked with each other without the assistance of said earth station.

6. A satellite capturing/tracking method according to claim 5, wherein said orbit/position information corresponds to an orbit element of said one of said data relay satellite or space station and longitude/latitude of an orbit plane projected on the earth surface; and said relationship data corresponds to visible/invisible information about the other of said data relay satellite or said space station with respect to the longitude/latitude of said one of said data relay satellite or space station.

7. A satellite method according to claim 5, wherein said capturing/tracking command supplied in said antenna driving step contains drive angle/drive velocity, and at said antenna driving step, an angle signal of said antenna is produced.

* * * * *